(12) United States Patent
Achutha et al.

(10) Patent No.: US 10,229,283 B2
(45) Date of Patent: *Mar. 12, 2019

(54) MANAGING APPLICATIONS IN NON-COOPERATIVE ENVIRONMENTS

(71) Applicant: Microsoft Technology Licensing, LLC, Redmond, WA (US)

(72) Inventors: Shruthi Achutha, Arlington, MA (US); Neil A. Jacobson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,793

(22) Filed: Jun. 7, 2017

(65) Prior Publication Data

US 2017/0270313 A1 Sep. 21, 2017

Related U.S. Application Data

(63) Continuation of application No. 14/928,574, filed on Oct. 30, 2015, now Pat. No. 9,703,977, which is a
(Continued)

(51) Int. Cl.
*G06F 17/00* (2006.01)
*G06F 12/14* (2006.01)
(Continued)

(52) U.S. Cl.
CPC ...... *G06F 21/6218* (2013.01); *G06F 9/44526* (2013.01); *G06F 17/30598* (2013.01);
(Continued)

(58) Field of Classification Search
CPC .... G06F 21/6218; G06F 21/629; G06F 21/52; G06F 17/30598; G06F 9/44526;
(Continued)

(56) References Cited

U.S. PATENT DOCUMENTS 5,974,549 A 10/1999 Golan
8,051,491 B1 * 11/2011 Cavage ............... G06F 21/6218
707/609

(Continued)

FOREIGN PATENT DOCUMENTS

WO 2013103959 A2 7/2013

OTHER PUBLICATIONS

Miller, Doug, "BYOD Not Dead, Long Live BYOD", Retrieved from <<https://web.archive.org/web/20160215173537/http://insights.wired.com/profiles/blogs/byod-is-not-dead>>, Oct. 16, 2013, 11 Pages.

(Continued)

*Primary Examiner* — Aravind K Moorthy
(74) *Attorney, Agent, or Firm* — Fiala & Weaver P.L.L.C.

(57) ABSTRACT

The present invention extends to methods, systems, and computer program products for managing applications in non-cooperative environments. Embodiments of the invention provide the ability to manage non-cooperative applications and operating systems. For example, applications and operating systems at a user's (e.g., an information worker's) personal device (e.g., smartphone) can be appropriately managed to provide more secure access to a corporate IT infrastructure. An IT worker can programmatically repackage an application, deploy it to a user's personal device, and manage the user's ability to use the application through policy.

16 Claims, 12 Drawing Sheets

Related U.S. Application Data continuation of application No. 14/104,570, filed on Dec. 12, 2013, now Pat. No. 9,213,830.

(51) Int. Cl.

| | |
|---|---|
| *H04L 29/06* | (2006.01) |
| *G06F 9/44* | (2018.01) |
| *G06F 21/62* | (2013.01) |
| *G06F 21/54* | (2013.01) |
| *G06F 9/445* | (2018.01) |
| *G06F 17/30* | (2006.01) |
| *G06F 21/52* | (2013.01) |
| *G06F 21/60* | (2013.01) |
| *G06F 11/34* | (2006.01) |

(52) U.S. Cl.
CPC .............. *G06F 21/52* (2013.01); *G06F 21/54* (2013.01); *G06F 21/604* (2013.01); *G06F 21/629* (2013.01); *G06F 9/44505* (2013.01); *G06F 11/3466* (2013.01); *G06F 21/6209* (2013.01); *G06F 2221/033* (2013.01); *H04L 63/20* (2013.01)

(58) Field of Classification Search
CPC .... G06F 21/54; G06F 21/604; G06F 11/3466; G06F 9/44505; G06F 21/6209; G06F 2221/033; H04L 63/20
USPC ................. 726/1, 22; 713/165; 717/121, 127
See application file for complete search history.

(56) References Cited

U.S. PATENT DOCUMENTS

| | | | |
|---|---|---|---|
| 8,468,595 | B1 | 6/2013 | Huang et al. |
| 8,869,235 | B2 | 10/2014 | Qureshi et al. |
| 9,043,480 | B2 | 5/2015 | Barton et al. |
| 9,213,830 | B2 * | 12/2015 | Achutha ............. G06F 21/6218 |
| 9,703,977 | B2 * | 7/2017 | Achutha ............. G06F 21/6218 |
| 2006/0288420 | A1 | 12/2006 | Mantripragada et al. |
| 2007/0157203 | A1 | 7/2007 | Lim |
| 2011/0047597 | A1 * | 2/2011 | Mahaffey ............... G06F 21/564 726/3 |
| 2012/0072509 | A1 | 3/2012 | Booth |
| 2012/0192247 | A1 * | 7/2012 | Oliver ................. G06F 21/6245 726/1 |
| 2012/0260217 | A1 | 10/2012 | Celebisoy |
| 2013/0091543 | A1 | 4/2013 | Wade et al. |
| 2013/0091557 | A1 | 4/2013 | Gurrapu |
| 2013/0130653 | A1 | 5/2013 | Deasy et al. |
| 2013/0227561 | A1 | 8/2013 | Walsh et al. |
| 2013/0227636 | A1 * | 8/2013 | Bettini ................. H04W 4/001 726/1 |
| 2013/0263212 | A1 | 10/2013 | Faltyn et al. |
| 2014/0040979 | A1 | 2/2014 | Barton et al. |
| 2014/0059573 | A1 | 2/2014 | Jawa et al. |
| 2014/0081508 | A1 | 3/2014 | Iida et al. |
| 2014/0109078 | A1 * | 4/2014 | Lang ......................... G06F 8/52 717/172 |
| 2014/0130119 | A1 | 5/2014 | Goldschlag et al. |
| 2014/0181896 | A1 | 6/2014 | Yablokov et al. |
| 2014/0282833 | A1 * | 9/2014 | Boyer ..................... G06F 21/57 726/1 |
| 2014/0298403 | A1 | 10/2014 | Qureshi |
| 2015/0026773 | A1 | 1/2015 | Dunphey et al. |
| 2015/0082441 | A1 | 3/2015 | Gathala et al. |
| 2015/0089632 | A1 | 3/2015 | Bartholomew et al. |

OTHER PUBLICATIONS

"Mobile Application Management", Retrieved from <<http://www.wipro.com/documents/mobile-application-management.pdf>>, Retrieved on: Oct. 21, 2013, 9 Pages.

"Why MAM is important for CIOs", Retrieved from <<http://www.cxotoday.com/story/why-mam-is-important-for-cios/>>, Jun. 10, 2013, 2 Pages.

"Non-Final Office Action Issued in U.S. Appl. No. 14/104,570", dated Apr. 8, 2015, 16 Pages.

"Notice of Allowance Issued in U.S. Appl. No. 14/104,570", dated Sep. 29, 2015, 10 Pages.

"Final Office Action Issued in U.S. Appl. No. 14/928,574", dated Sep. 16, 2016, 6 Pages.

"Non-Final Office Action Issued in U.S. Appl. No. 14/928,574", dated May 20, 2016, 20 Pages.

"Notice of Allowance Issued in U.S. Appl. No. 14/928,574", dated Mar. 16, 2017, 8 Pages.

Abad, et al., "Log Correlation for Intrusion Detection: A Proof of Concept", In Proceedings of the 19th Annual Computer Security Applications Conference, Dec. 8, 2003, 10 Pages.

Dai, et al., "MAPMon: A Host-Based Malware Detection Tool", In Proceedings of 13th IEEE International Symposium on Pacific Rim Dependable Computing, Dec. 17, 2007, 8 Pages.

Douglas, "Embrace the BYOD Future with Mobile Cloud Computing Applications", Retrieved From <<http://www.zeroonezero.com/blog/index.php/iphoneipad-application-developmenl/embrace-the-byod-future-with-mobile-cloud-computing-applications/>>, Feb. 14, 2013, 5 Pages.

"International Search Report & Written Opinion Received for PCT Application No. PCT/US2014/068977", dated May 7, 2015, 18 Pages.

"International Search Report & Written Opinion for PCT Application No. PCT/US2014/068976", dated Jun. 12, 2015, 16 Pages.

"Second Written Opinion Issued in Patent Application No. PCT/US2014/068976", dated Nov. 6, 2015, 5 Pages.

"International Preliminary Report on Patentability Issued in PCT Application No. PCT/US2014/068977", dated Jun. 23, 2016, 13 Pages.

"International Preliminary Report on Patentability Issued in PCT Application No. PCT/US2014/068976", dated Feb. 5, 2016, 6 Pages.

\* cited by examiner

MANAGING APPLICATIONS IN NON-COOPERATIVE ENVIRONMENTS

CROSS-REFERENCE TO RELATED APPLICATIONS

This application is a continuation of and claims the benefit of and priority to U.S. patent application Ser. No. 14/928,574, entitled "Managing Applications In Non-Cooperative Environments", filed Oct. 30, 2015 by Shruthi Achutha et. al., the entire contents of which are expressly incorporated by reference. That application is a continuation of and claims the benefit of and priority to U.S. patent application Ser. No. 14/104,570, now U.S. Pat. No. 9,213,830, entitled "Managing Applications In Non-Cooperative Environments", filed Dec. 12, 2013 by Shruthi Achutha et. al., the entire contents of which are expressly incorporated by reference.

This application is related to U.S. patent application Ser. No. 14/104,580, entitled, "Configuring Applications And Policies In Non-Cooperative Environments", filed Dec. 12, 2013, by Neil A. Jacobson et al., the entire contents of which are expressly incorporated by reference.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In corporate computing environments, employees are often permitted to connect their personal devices (e.g., smartphones) to the corporate IT infrastructure. Allowing employees access to corporate resources through personal devices can increase employee efficiency and productivity. For example, an employee may have their smartphone with them nearly all the time, even when they are not at work. As such, the employee also has efficient access to many corporate resources nearly all the time.

However, permitting employees to access corporate resources via personal devices also opens the corporate IT infrastructure to various security risks. Most operating systems and applications for personal devices are not written with management in mind. That is, these operating systems and applications are not extensible and do not have a management surface that an IT professional can use to regulate and, when appropriate, disable the operating system or application. Thus, employees can easily use a personal device to transfer corporate resources between systems inside a corporate IT infrastructure and (potentially unsecure) systems outside of the corporate IT infrastructure. Among other things, these types of data transfer provide a vector for malicious activity, make it more difficult to comply with laws and regulations, such as, The Health Insurance Portability and Accountability Act ("HIPPA") and Sarbanes-Oxley, and make it difficult to remove access for terminated employees.

BRIEF SUMMARY

The present invention extends to methods, systems, and computer program products for managing applications in non-cooperative environments. In some embodiments, an application is packaged. A target application is accessed. The target application contains a target executable, target metadata, and target graphics. The target executable configured to execute when the target application is selected for execution. The target metadata describes the target application. The target graphics are used to present the target application for user selection at a display device.

An applicable policy is selected for the target application. An amended application is created. The amended application includes a hooking library and amended application metadata. The amended application is configured to load the hooking library when the amended application is executed. The hooking library is configured to monitor API calls from the target application to external libraries. The amended application metadata describes the amended application.

The target graphics are stored within the amended application so that the amended application can be presented as the target application when the amended application is presented for user selection at a display device.

In other embodiments, a policy is updated for an application. Input is received indicating that an amended application is to be executed. The amended application is associated with a target application. In response to the input, the target application is executed. One or more policy elements of a policy are accessed. The policy is to be enforced against the target application.

The target application is monitored for compliance with the policy. During execution of the target application, one or more additional policy elements are received. The policy is updated in accordance with the one or more additional policy elements to create an updated policy that is to be enforced against the target application. The target application is monitored for compliance with the updated policy.

In further embodiments, a container is created for a plurality of applications. For each of a plurality of amended applications at a computing device, a policy associated with the amended application is accessed. The policy is to be enforced against an associated target application. It is determined that the plurality of amended applications are permitted to exchange data with one another based on the accessed polices.

For each amended application in the plurality of amended applications, the associated policy is updated to provide the amended application with the identity of and access to other amended applications included in the plurality of amended applications. Access to the other amended applications enables the associated target application to exchange data with other associated target applications associated with the plurality of amended applications. The plurality of amended applications is isolated from other applications at the computing device by preventing the other applications from accessing any of the plurality of amended applications.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
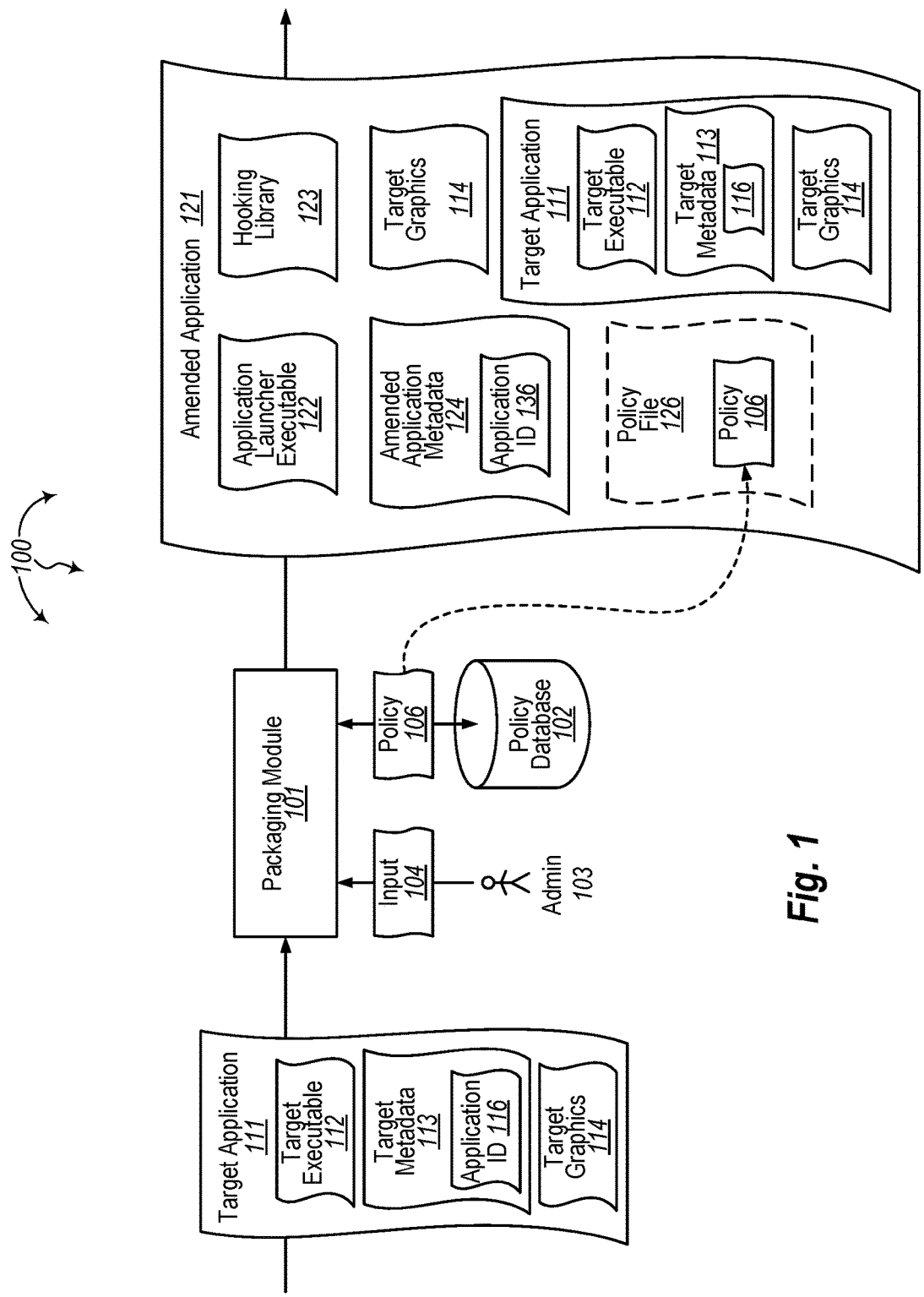
FIG. 1 illustrates an example computer architecture that facilitates packaging an application.

The present invention extends to methods, systems, and computer program products for managing applications in non-cooperative environments. In some embodiments, an application is packaged. A target application is accessed. The target application contains a target executable, target metadata, and target graphics. The target executable configured to execute when the target application is selected for execution. The target metadata describes the target application. The target graphics are used to present the target application for user selection at a display device.

An applicable policy is selected for the target application.

An amended application is created. The amended application includes a hooking library and amended application metadata. The amended application is configured to load the hooking library when the amended application is executed. The hooking library is configured to monitor API calls from the target application to external libraries. The amended application metadata describes the amended application.

The target graphics are stored within the amended application so that the amended application can be presented as the target application when the amended application is presented for user selection at a display device.

In other embodiments, a policy is updated for an application. Input is received indicating that an amended application is to be executed. The amended application is associated with a target application. In response to the input, the target application is executed. One or more policy elements of a policy are accessed. The policy is to be enforced against the target application.

The target application is monitored for compliance with the policy. During execution of the target application, one or more additional policy elements are received. The policy is updated in accordance with the one or more additional policy elements to create an updated policy that is to be enforced against the target application. The target application is monitored for compliance with the updated policy.

In further embodiments, a container is created for a plurality of applications. For each of a plurality of amended applications at a computing device, a policy associated with the amended application is accessed. The policy is to be enforced against an associated target application. It is determined that the plurality of amended applications are permitted to exchange data with one another based on the accessed polices.

For each amended application in the plurality of amended applications, the associated policy is updated to provide the amended application with the identity of and access to other amended applications included in the plurality of amended applications. Access to the other amended applications enables the associated target application to exchange data with other associated target applications associated with the plurality of amended applications. The plurality of amended applications is isolated from other applications at the computing device by preventing the other applications from accessing any of the plurality of amended applications.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the application provide the ability to manage non-cooperative applications and operating systems. For example, applications and operating systems at a user's (e.g., an information worker's) personal device (e.g., smartphone) can be appropriately managed to provide more secure access to a corporate IT infrastructure. An IT worker can programmatically repackage an application, deploy it to a user's personal device, and manage the user's ability to use the application through policy. Example policies include: requiring authentication before use, requiring encryption of data, limiting a users' ability to transfer data in and out of the application, requiring a computing device to be within the bounds of a specified geographical area, permitting access to an application during a specified time window, etc.

FIG. 1 illustrates an example computer architecture 100 that facilitates packaging an application. Referring to FIG. 1, computer architecture 100 includes packaging module 101 and policy database 102. Each of packaging module 101 and policy database 102 can be connected to one another over (or be part of) a network, such as, for example, a Local Area Network ("LAN"), a Wide Area Network ("WAN"), and even the Internet. Accordingly, packaging module 101 and policy database 102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, packaging module 101 is configured to access a target application and associate the target application with (e.g., embed the target application within) an amended application. Packaging module 101 can also associate policy with the amended application. The associated policy can be used to manage an information worker's (or other user's) ability to use the target application. Policy can be contained within the amended application or managed at a server. An application identifier can be used by a server (or other computer system) to match policy to a corresponding application (either during packaging or subsequent enforcement).

Policy database 102 stores policy that is used to manage applications. Packaging application 101 can access policy from policy database 102. In some embodiments, packaging application 101 accesses policy from policy database 102 and inserts the accessed policy within an amended application. In other embodiments, packaging application 101 associates an application identifier with a policy stored in policy database 102. The application identifier can then be used to match the policy to the corresponding application (either during packaging or subsequent enforcement).

Figure 2:
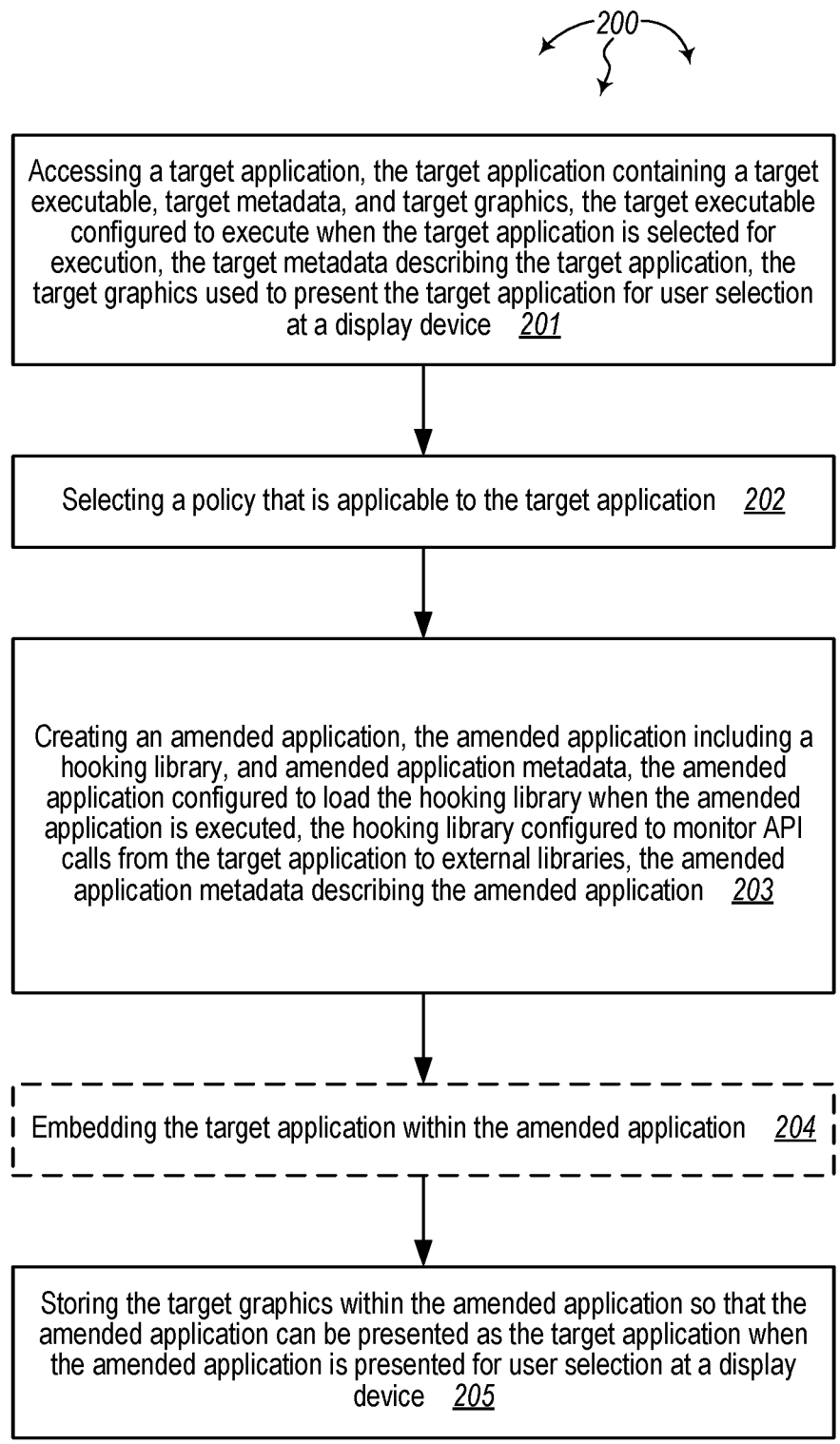
FIG. 2 illustrates a flow chart of an example method for packaging an application.

FIG. 2 illustrates a flow chart of an example method 200 for packaging an application. Method 200 will be described with respect to the components and data of computer architecture 100.

Method 200 includes accessing a target application, the target application containing a target executable, target metadata, and target graphics, the target executable configured to execute when the target application is selected for execution, the target metadata describing the target application, the target graphics used to present the target application for user selection at a display device (201). For example, packaging module 101 can access target application 111. As depicted, target application 111 includes target executable 112, target metadata 113, and target graphics 114. Target executable 112 is configured to execute when target application 111 is selected for execution. Target metadata 113 describes target application 111, and can include an application identifier 116 for target application 111. Target graphics 114 can include icon(s) and splash screen(s) used by target application 111. For example, target graphics 114 can include an icon that is presented at a user interface to indicate that target application 111 is available for execution.

Method 200 includes selecting a policy that is applicable to the target application (202). For example, packaging module 101 can select policy 106 that is applicable to target application 111. In some embodiments, policy 106 is associated with application ID 116. Alternately or in combination, admin 103 can enter input 104 to select policy 106 as applicable to target application 111. Policy 106 can define various restrictions on the exchange of data with target application 111, such as, for example, preventing cut and paste operations at target application 111, requiring encryption of data exchanged with target application 111, requiring authorization prior permitting data exchange with target application 111, disabling target application 111, etc.

Method 200 includes creating an amended application, the amended application including a hooking library and amended application metadata, the amended application configured to load the hooking library when the amended application is executed, the hooking library configured to monitor API calls from the target application to external libraries, the amended application metadata describing the amended application (203). For example, packaging module 101 can create amended application 121.

Amended application 121 includes application launcher executable 122, hooking library 123, amended application metadata 124, target graphics 114. Application launcher executable 122 is configured to execute when amended application 121 is selected for execution. Application launcher executable 122 is also configured to load hooking library 123 when amended application 121 is executed. Hooking library 123 is configured to monitor API calls from target application 111 to external libraries.

In other embodiments, packaging module 101 includes hooking library 123 in target application 111. In these embodiments, target executable 112 can be modified to load hooking library 123 and application launcher executable 122 can be omitted. Also in these embodiments, amended application metadata 124 can be included in target metadata 113.

Amended application metadata 124 describes amended application 121, and can include an application identifier 136 for amended application 121. Application identifier 116 and application identifier 136 can differ so that target application 111 can be distinguished from amended application 121.

Optionally, amended application 121 can also include policy file 126. Policy file 126 can be used to store one or more policy elements for enforcing a policy against target application 111 when the target application 111 is executed. For example, packaging application 101 can insert policy elements for enforcing policy 106 into policy file 126.

Alternately, packaging module 101 can associate application ID 136 to policy elements of policy 106 stored in policy database 102. A server (or other computer systems) can subsequently use application ID 136 to access the policy elements of policy 106 from policy database 102.

Method 200 optionally includes embedding the target application within the amended application (204). For example, packaging module 101 can embed target application 111 within amended application 121. In other embodiments, target application 111 is itself the amended application.

Method 200 includes storing the target graphics within the amended application so that the amended application can be presented as the target application when the amended application is presented for user selection at a display device (205). For example, packaging module 101 can store target graphics 114 within amended application 121. Target graphics 114 (e.g., an icon) can be used when presenting amended application 121 at a user interface so that amended application 121 appears as target application 111.

Accordingly, an amended application can include framework code that enables monitoring of an associated target application during execution.

Figure 3:
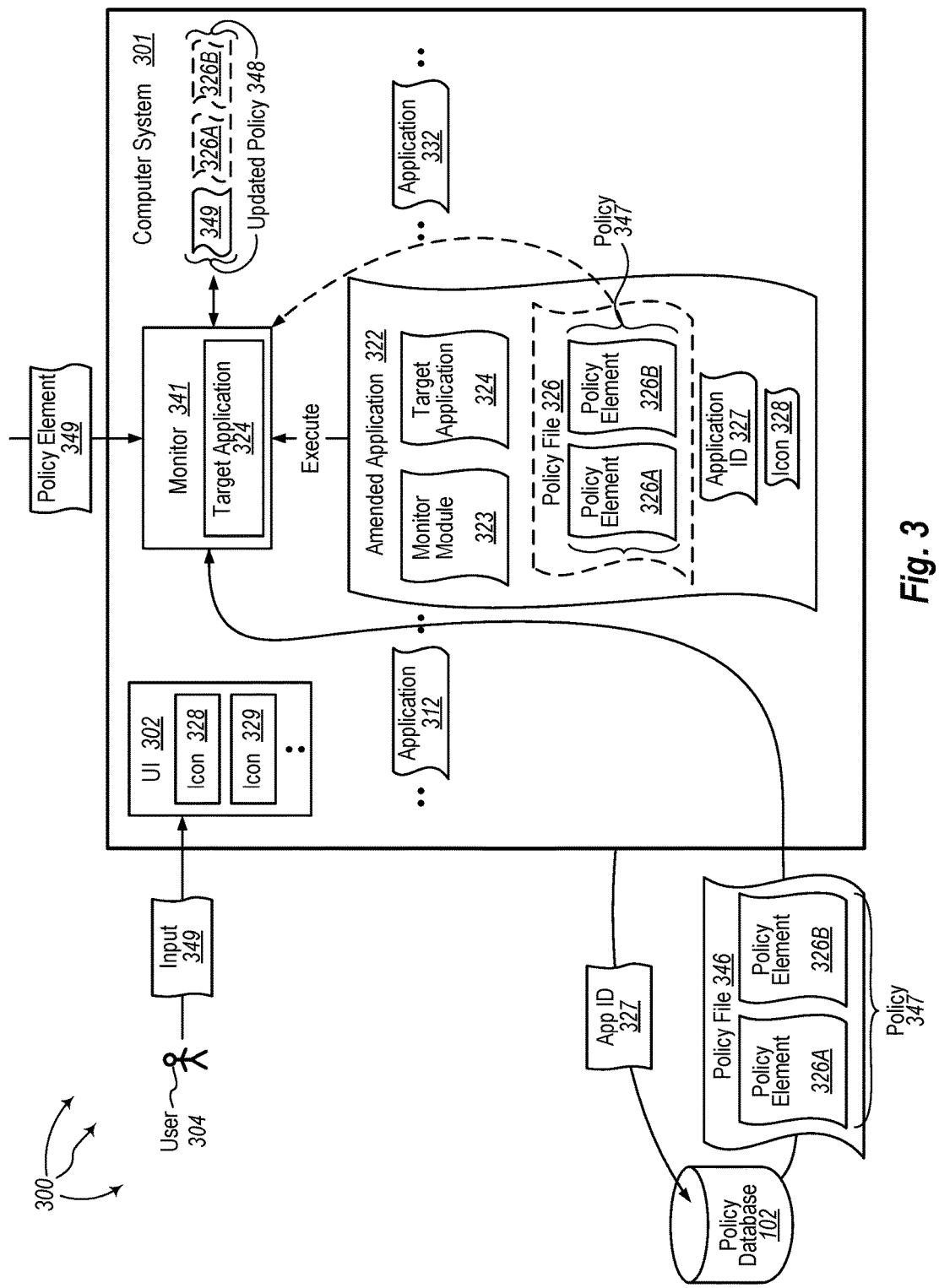
FIG. 3 illustrates an example computer architecture that facilitates updating policy for an application.

FIG. 3 illustrates an example computer architecture 300 that facilitates updating policy for an application. Referring to FIG. 3, computer architecture 300 includes computer system 301 (e.g., a mobile phone or tablet) and policy database 102. Each of computer system 301 and policy database 102 can be connected to one another over (or be part of) a network, such as, for example, a Local Area Network ("LAN"), a Wide Area Network ("WAN"), and even the Internet. Accordingly, computer system 301 and policy database 102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Computer system 301 includes user interface 302. User interface 302 can be used to present icons 328, 329, etc., for corresponding applications 311 (application 312, amended application 322, application 332, etc.) that are available for execution. For example, icon 328 can be presented at user interface 302 to indicate that amended application 322 is available for execution. Generally, in response to receiving input selecting an icon for an amended application, a monitor (e.g., monitor 341) for monitoring the corresponding target application (e.g., target application 324) can be executed. The monitor can monitor calls between the target application and other external libraries and also enforce an assigned policy for the target application.

Figure 4:
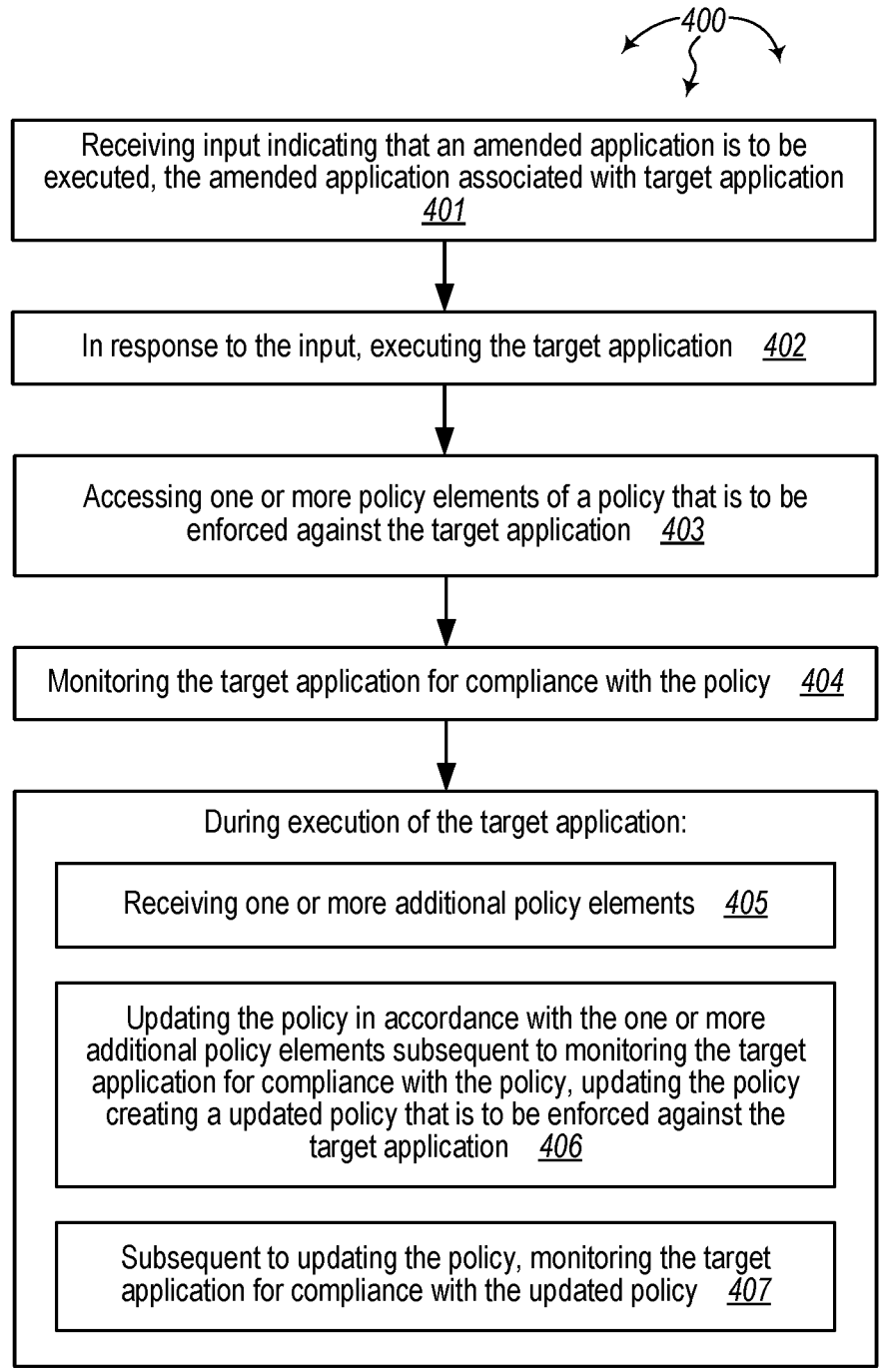
FIG. 4 illustrates a flow chart of an example method for updating policy for an application.

FIG. 4 illustrates a flow chart of an example method 400 for updating policy for an application. Method 400 will be described with respect to the components and data of computer architecture 300.

Method 400 includes receiving input indicating that an amended application is to be executed, the amended application associated with a target application (401). For example, user 304 can submit input 349 to computer system 301. Input 349 can be received by computer system 301. Input 349 can be a selection of icon 328 from user interface 302 (indicating that amended application 322 is to be executed).

In some embodiments, icon 328 is also the icon used to present target application 324 for execution. As such, selection of icon 328 may lead user 304 to believe they have selected target application 324 for execution.

However, in response to user input 349, computer system 301 can execute monitor module 323 to load monitor 341. Monitor 341 can be configured to monitor calls between target application 324 and other external libraries and also enforce a policy associated with target application 324.

Method 400 includes in response to the input, executing the target application (402). For example, in response to user input 349, target application 324 can be executed. As depicted, target application 324 is executed within the environment of monitor 341. As such, monitor 341 can monitor calls between target application 324 and external libraries.

Method 400 includes accessing one or more policy elements of a policy that is to be enforced against the target application (403). For example, monitor 341 can access policy elements 326A and 326B of policy 347 that is to be enforced against target application 324. Policy elements 326A and 326B can indicate to monitor 341 what management operations are to be taken for target application 324. Policy elements 326A and 326B can indicate that API requests related to cut and paste are to be denied, that the contents of a file are be encrypted, that user authorization is required, that target application 324 is to be disabled, requiring that computer system 301 be within the bounds of a specified geographical area, allowing access to target application 324 only during a specified time window, etc.

In some embodiments, computer system 301 sends application ID 327 to policy database 102. Policy database 102 matches application ID 327 to corresponding policy elements for amended application 322 (and that are to be enforced against target application 324). Policy database 102 returns a policy file back to computer system 301. For example, policy database 102 can return policy file 346, containing policy elements 326A and 326B, back to computer system 301.

In other embodiments, monitor 341 accesses policy elements 326A and 326B from policy file 326, which is contained in amended application 322.

Method 400 includes monitoring the target application for compliance with the policy (404). For example, monitor 341 can monitor target application 324 for compliance with policy 347 (defined by policy elements 326A and 326B). Method 400 includes, during execution of the target application, receiving one or more additional policy elements (405). For example, during execution of target application 324, monitor 341 can receive policy element 349.

Method 400 includes, during execution of the target application, updating the policy in accordance with the one or more additional policy elements subsequent to monitoring the target application for compliance with the policy, updating the policy creating a updated policy that is to be enforced against the target application (406). For example, during execution of target application 324, policy 347 can be updated to updated policy 348 in accordance with policy element 349. Policy element 349 can be used to update, modify, supplement, or even replace one or more of policy elements 326A and 326B. As such, updated policy 348 can be defined by policy element 349 along with zero or more of policy elements 326A and 326B (as indicated by the dashed lines).

Policy elements defining updated policy 348 can also be stored back into policy file 326 and/or associated with application ID 327 in policy database 102.

Method 400 includes, during execution of the target application and subsequent to updating the policy, monitoring the target application for compliance with the updated policy (407). For example, during execution of target application 324 and subsequent to updating policy 347, monitor 341 can monitor target application 324 for compliance with updated policy 348.

Accordingly, the policy for an application (e.g., a target application) can be updated while the application is executing. Further, the application can be subsequently monitored for compliance with an updated policy also while the application is executing.

Figure 5A:
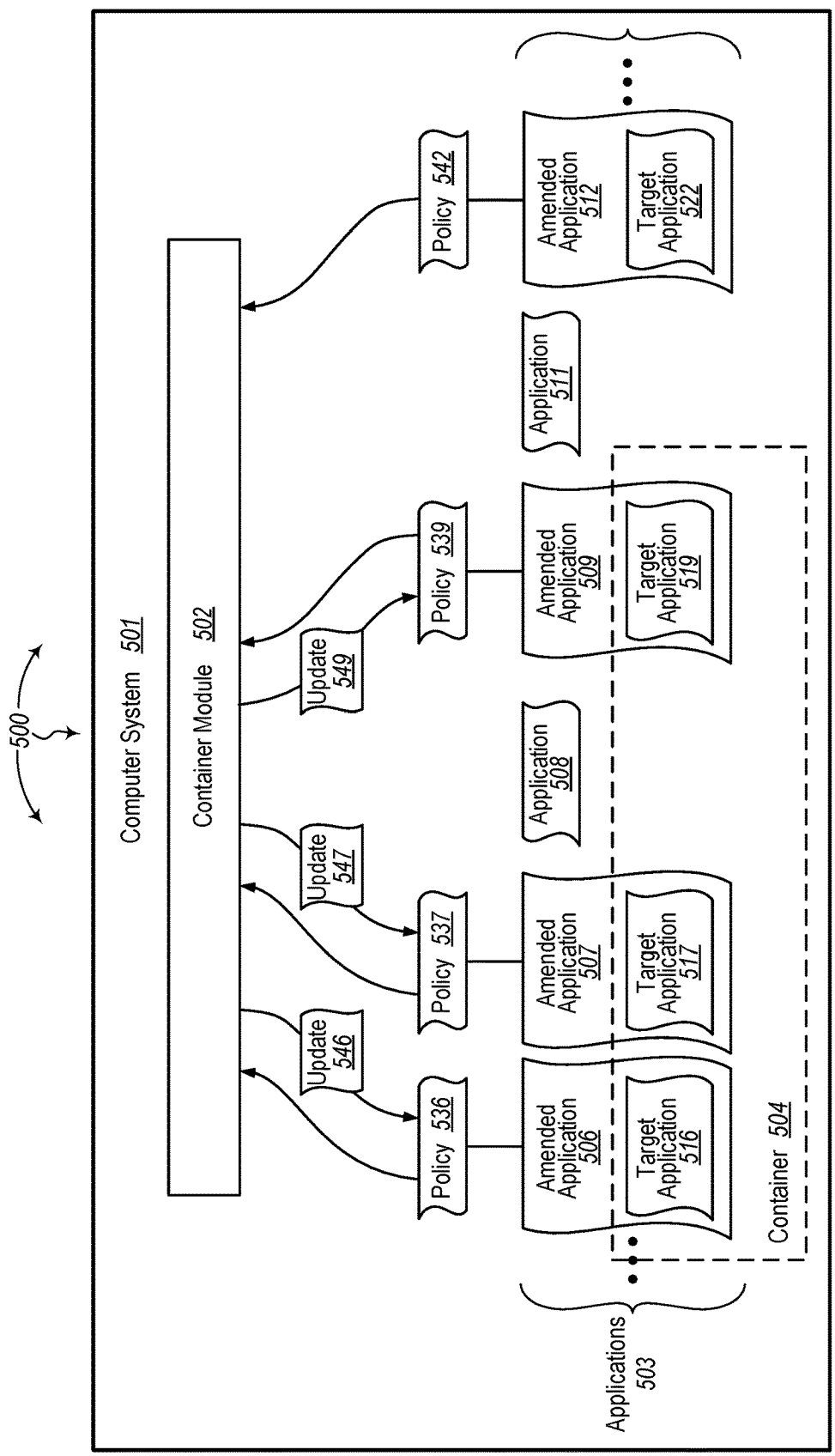
FIGS. 5A and 5B illustrate an example computer architecture that facilitates creating a container for a plurality of applications.
Figure 5B:
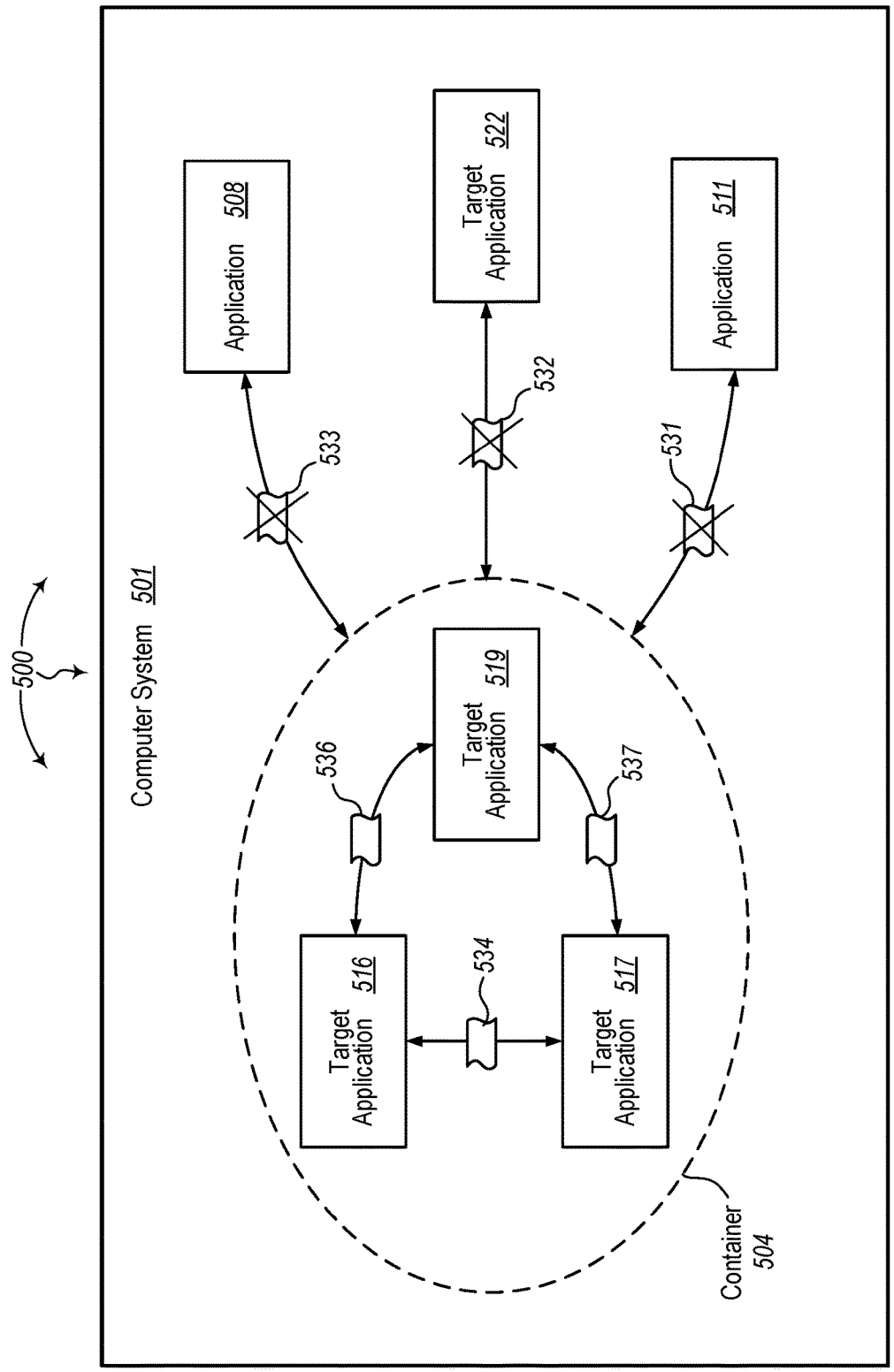

FIGS. 5A and 5B illustrate an example computer architecture 500 that facilitates creating a container for a plurality of applications. Referring to FIG. 5A, computer architecture 500 includes computer system 501 (e.g., a mobile phone or tablet). Computer system 501 can be connected to (or be part of) a network, such as, for example, a Local Area Network ("LAN"), a Wide Area Network ("WAN"), and even the Internet. Accordingly, computer system 501 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, computer system 501 includes container module 502. In general, container module 502 is configured to group applications together in containers based on corresponding policies associated with the applications. Applications within the same container can have increased privileges for exchanging data with one another relative to exchanging data with applications outside the container.

Computer 501 also includes applications 503. Within applications 503 there are amended applications, including amended applications 506, 507, 509, and 512, and non-amended applications, including applications 508 and 511. Target applications can be associated with (e.g., embedded within) amended applications. For example, target applications 516, 517, 519, and 522 are embedded within amended applications 506, 507, 509, and 512 respectively.

Amended applications can be associated with policies that are to be enforced against corresponding target applications. For example, polices 536, 537, 539, and 542 are associated with amended applications 506, 507, 509, and 512 respectively for enforcement against target applications 516, 517, 519, and 522 respectively. Polices can be contained within amended applications or accessed from a policy database (e.g., policy database 102).

Figure 6:
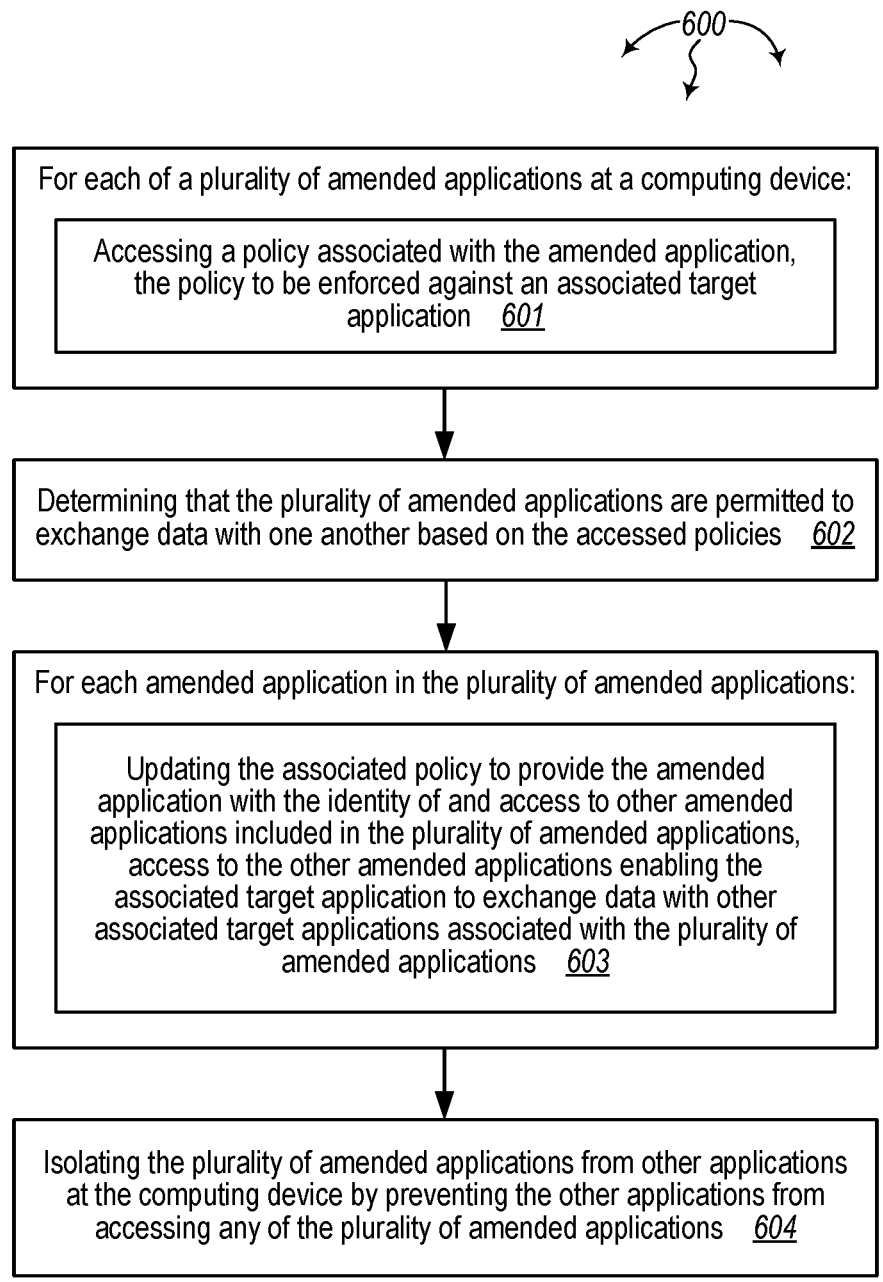
FIG. 6 illustrates a flow chart of an example method for creating a container for a plurality of applications.

FIG. 6 illustrates a flow chart of an example method 600 for creating a container for a plurality of applications. Method 600 will be described with respect to the components and data of computer architecture 500.

Method 600 includes for each of a plurality of amended applications at a computing device, accessing a policy associated with the amended application, the policy to be enforced against an associated target application (601). For example, for each of amended applications 506, 507, and 509, container module 502 can access policies 536, 537, and 539 respectively. As described, policies 536, 537, and 539 are to be enforced against target applications 516, 517, and 519 respectively.

Method 600 includes determining that the plurality of amended applications are permitted to exchange data with one another based on the accessed polices (602). For example, container module 502 can determine that amended applications 506, 507, and 509 are permitted to exchange data with one another based on policies 536, 537, and 539. Determining that the exchange of data between applications is permitted can be based on associated policies enforcing the same or similar requirements on exchanged data. For example, each of polices 536, 537, and 539 can require the same or similar one or more of: user authorization, data encryption, etc., for target applications 516, 517, and 519 respectively. Each of polices 536, 537, and 539 can also prohibit the exchange of data with other applications not having the same or similar policies enforced (and may prohibit the exchange of data with any other applications).

Container module 502 can also access policy 542. However, policy 542 may have relevant differences from each of policies 536, 537, and 539. For example, policy 542 may not require user authorization or data encryption for target application 522. As such, container module 502 can determine that amended applications 506, 507, and 509 are not permitted to exchange data with amended application 512. Since applications 508 and 511 have no associated policy, container module 502 can also determine that amended applications 506, 507, and 509 are not permitted to exchange data with applications 508 and 511.

Method 600 includes for each amended application in the plurality of amended applications, updating the associated policy to provide the amended application with the identity of and access to other amended applications included in the plurality of amended applications, access to the other amended applications enabling the associated target application to exchange data with other associated target applications associated with the plurality of amended applications (603). For example, for each of amended applications 506, 507, and 509, container module 502 can update policies 536, 537, and 539 with updates 546, 547, and 549 respectively. Updates 546, 547, and 549 provide each of amended applications 506, 507, and 509 respectively with the identity of and access to each of the other amended applications 506, 507, and 509. Providing each of each of amended applications 506, 507, and 509 with the identity of and access to each of the other amended applications 506, 507, and 509 enables target applications 516, 517, and 519 to exchange data with one another.

Method 600 includes isolating the plurality of amended applications from other applications at the computing device by preventing the other applications from accessing any of the plurality of amended applications (604). For example, container application 502 can isolate amended applications 506, 507, and 509 from other applications at computer system 501 (including applications 508 and 511 and amended application 512) by including amended applications 506, 507, and 509 in container 504.

In general, target applications within the same container can be permitted to exchange data with one another. On the other hand, target applications within a container may be prevented from exchanging data with other applications outside the container. Turning to FIG. 5B for example, data elements 534, 546, and 537 represent that target applications 516, 517, and 519 are permitted to exchange data with one another (e.g., directly, through cut and paste operations, etc.). On the other hand, crossed out data elements 531, 532, and 533 represent that target applications 516, 517, and 519 are prevented from exchanging data with applications 508 and 511 and with target application 522.

In some embodiments, target applications within the same container are provided access to a named clipboard. The named clipboard can be used to share data among the target applications (but is not known to applications outside the container).

Figure 7A:
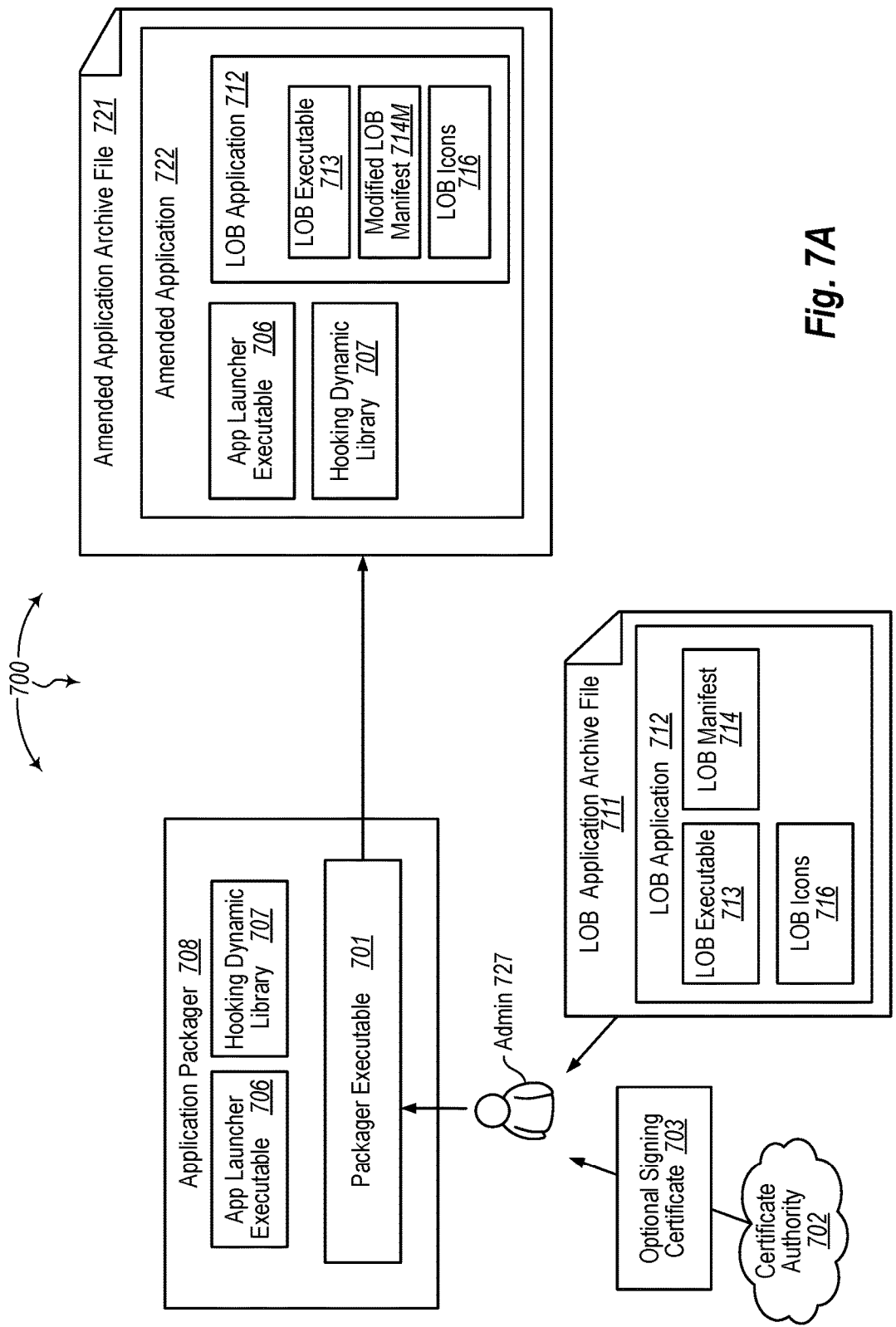
FIG. 7A illustrates an example data flow for packaging an application.

FIG. 7A illustrates a data flow 700 for packaging an application. Generally, application packager 708 can create an amended application for a target application. Application packager 708 can receive a target application as input. Application packager 708 can then modify the target application by creating an amended application and embedding the target application in the amended application. The amended application can include client framework code that enables monitoring of the target application.

As depicted, application packager 708 includes app launcher executable 706 and hooking dynamic library 707. Application packager 708 can include app launcher executable 706 and hooking dynamic library 707 in amended application 722. When amended application 722 is selected for execution, app launcher executable 706 can execute. App launcher 706 can then load hooking dynamic library 707 for monitoring LOB application 712.

More specifically, admin 727 can cause LOB (line of business) application archive file 711 (e.g., an .ipa, an apk file, an .appx file, etc.) along with optional signing certificate 703 (from certificate authority 702) to be sent to application packager 708.

LOB application archive file 711 includes LOB application 712. LOB application 712 (a target application) further includes LOB executable 713, LOB manifest 714, and LOB icons 716. LOB executable 713 is executed when LOB application 712 is selected for execution. LOB manifest 714 can contain settings (e.g., user settings) for LOB application 712. LOB icons 716 can store icons associated with LOB application 712, such as, for example, an icon presented at a user interface to indicate that LOB application 712 can be selected for execution.

Optional signing certificate 703 can be used to sign a resulting amended application.

Packager executable 701 can use optional signing certificate 703 and application archive file 711 to create amended application archive file 721. As depicted, amended application archive file 721 includes amended application 722. Amended application 722 can be signed using optional signing certificate 703.

Amended application 722 further includes app launcher executable 706, hooking dynamic library 707, and LOB application 712. When amended application 722 is selected for execution, app launcher executable 706 can execute. App launcher 706 can then load hooking dynamic library 707 for monitoring embedded LOB executable 713. Modified LOB manifest 714M can contain settings (e.g., user settings) for amended application 722. Modified LOB manifest 714M can include some settings from LOB property list 714 (e.g., settings for giving amended application 722 the look and feel of LOB application 712).

LOB icons 716 can also be used to give amended application 722 the look and feel of LOB application 712. For example, an icon from LOB icons 716 can be presented at a user interface to indicate that amended application 722 is selectable for execution. Other icons in LOB icons 716 can be used during execution of app launcher executable 706.

Figure 7B:
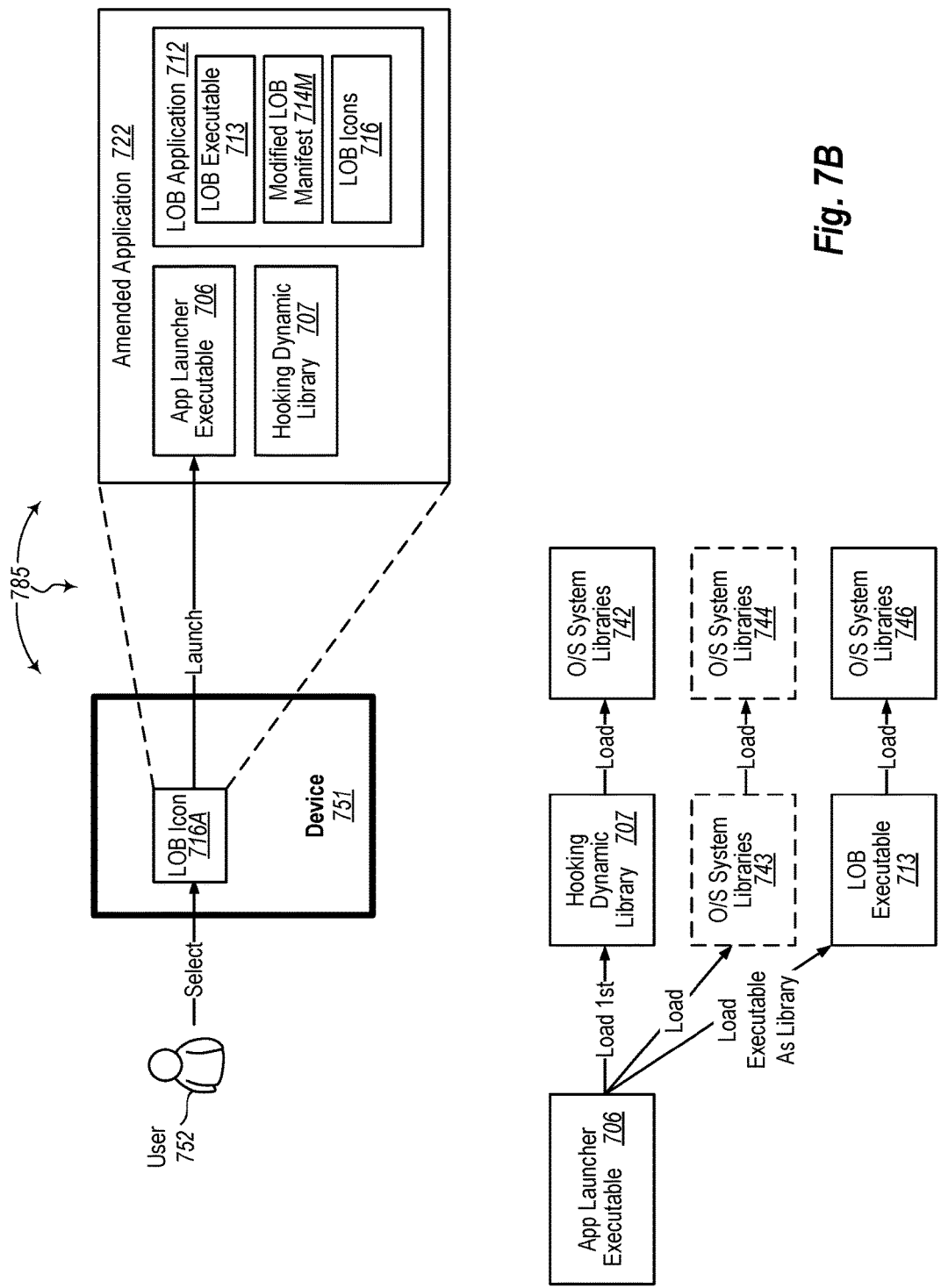
FIG. 7B illustrates an example data flow for enforcing policy against an application.

FIG. 7B illustrates a data flow 725 for executing a target application. Turning to FIG. 7B, amended application archive file 721 can be a mobile application stored at device 751 (e.g., a mobile phone or tablet). LOB icon 716A (an icon contained in LOB icons 716) can be presented at a user interface of device 751. User 752 can select LOB icon 716A. Selecting LOB icon 716A causes app launcher executable 706 to execute.

App launcher executable 706 can first load hooking dynamic library 707 which in turn loads O/S system libraries 742. App launcher executable 706 can also optionally load other O/S libraries, such as, O/S libraries 743, which in turn load other O/S libraries, such as, O/S libraries 744. Subsequent to loading hooking library 707, app launcher executable 706 can also load LOB executable 713 as a library. LOB executable can in turn load O/S libraries 746.

Dynamic hooking library 707 can be configured to monitor API requests from LOB executable 713. In some embodiments, dynamic hooking library 707 exports functions with the same name as system functions. When a symbol is resolved, a resolver can use the first library which exports the symbol. Since dynamic hooking library 707 is loaded first, functions exported by dynamic hooking library 707 get called instead of the intended library functions. Exported functions can include functions related to the exchange of data, such as, for example, fopen( ), open( ), etc. Exported functions can also be used to intercept clipboard data. Accordingly, hooking dynamic library 707 can monitor API requests from LOB executable 713 using exported function techniques.

In other embodiments, the first few instructions of an original function (e.g., fopen ( )) are overwritten to jump to a function in dynamic hooking library 707, which can jump back to the original function if appropriate. In further embodiments, features of a language runtime are used to hook functions. For example, the Objective-C runtime supports replacing methods with custom implementations. As such, hooking dynamic library 707 can monitor API requests from LOB executable 713 using these techniques as well.

During execution, hooking dynamic library 707 can access policy (e.g., from a contained policy file or from a policy database) that is to be enforced against LOB executable 713. Hooking dynamic library 707 can prevent data exchanges with LOB executable 713 when the data exchanges do not comply with the accessed policy. In some embodiments, hooking dynamic library 707 can notify user 752 how to comply with an accessed policy, such as, for example, by authenticating, using encryption, checking GPS coordinates of device 751 against a specified geographic area, or checking time data against a specified time window. When indicated by the accessed policy, hooking dynamic library 707 can also disable LOB executable 713.

Figure 7C:
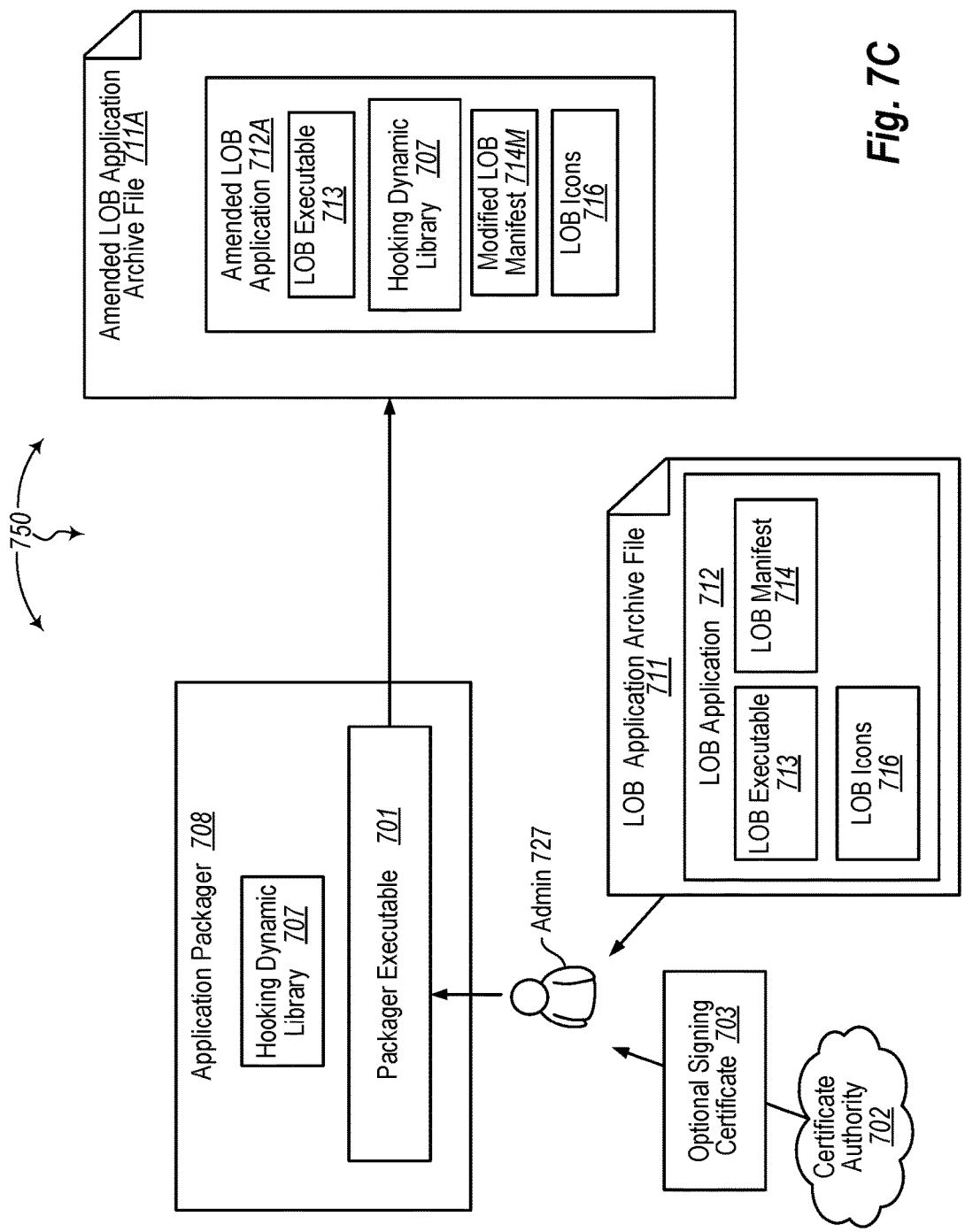
FIG. 7C illustrates another example data flow for packaging an application.

FIG. 7C illustrates a data flow 750 for packaging an application. As described, application packager 708 can create an amended application for a target application. Application packager 708 can receive a target application as input. Application packager 708 can then modify the target application by creating an amended application. The amended application can include client framework code that enables monitoring of the target application.

As depicted, application packager 708 includes hooking dynamic library 707. Application packager 708 can include hooking dynamic library 707 in amended LOB application 712A. LOB executable 713 can also be modified to load hooking dynamic library 707. As such, when amended LOB application 712A is selected for execution, LOB executable 713 can load hooking dynamic library 707. Hooking dynamic library 707 can then monitor LOB executable 713.

More specifically, admin 727 can cause LOB (line of business) application archive file 711 (e.g., an .ipa file, an .apk file, an .appx file, etc.) along with optional signing certificate 703 (from certificate authority 702) to be sent to application packager 708.

LOB application archive file 711 includes LOB application 712. LOB application 712 further includes LOB executable 713, LOB manifest 714, and LOB icons 716. LOB executable 713 is executed when LOB application 712 is selected for execution. LOB manifest 714 can contain settings (e.g., user settings) for LOB application 712. LOB icons 716 can store icons associated with LOB application 712, such as, for example, an icon presented at a user interface to indicate that LOB application 712 can be selected for execution.

Optional signing certificate 703 can be used to sign a resulting amended application.

Packager executable 701 can use optional signing certificate 703 and application archive file 711 to create amended LOB application archive file 711A. As depicted, amended LOB application archive file 711A includes amended LOB application 712A. Amended LOB application 712A can be signed using optional signing certificate 703.

Amended LOB application 712A further includes hooking dynamic library 707. When amended LOB application 712A is selected for execution, LOB executable 713 can execute. LOB executable 713 can then load hooking dynamic library 707. Hooking dynamic library 707 can monitor LOB executable 713. Modified LOB manifest 714M can contain settings (e.g., user settings) for amended LOB application 712A. Modified LOB manifest 714M can include some settings from LOB property list 714 (e.g., settings for giving amended application 712A the look and feel of LOB application 712).

LOB icons 716 can also be used to give amended LOB application 712A the look and feel of LOB application 712. For example, an icon from LOB icons 716 can be presented at a user interface to indicate that amended LOB application 712A is selectable for execution. Other icons in LOB icons 716 can be used during execution of LOB executable 713.

Figure 7D:
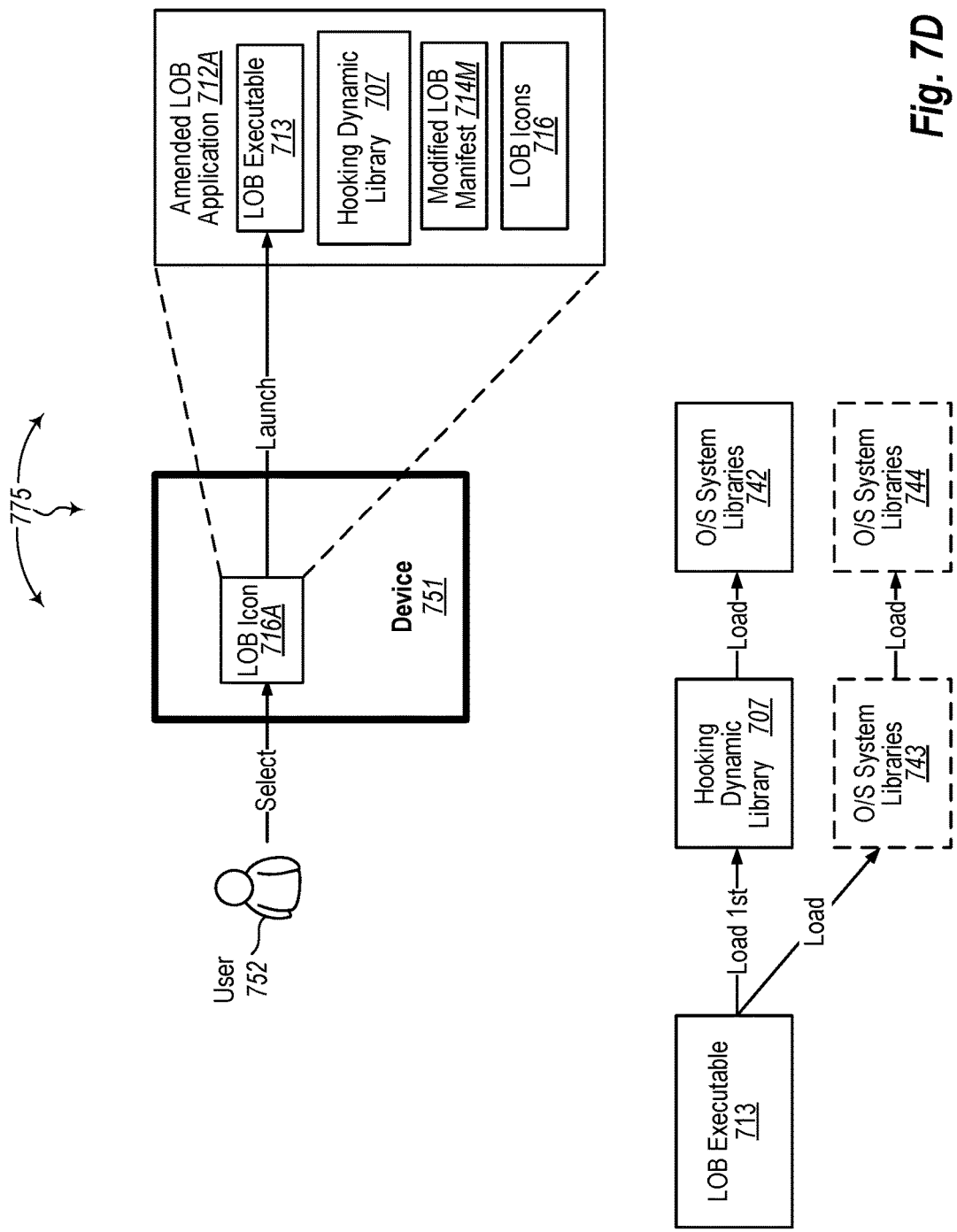
FIG. 7D illustrates another example data flow for enforcing policy against an application.

FIG. 7D illustrates a data flow 775 for executing a target application. Turning to FIG. 7D, amended application archive file 711A can be a mobile application stored at device 751 (e.g., a mobile phone or tablet). LOB icon 716A (an icon contained in LOB icons 716) can be presented at a user interface of device 751. User 752 can select LOB icon 716A. Selecting LOB icon 716A causes LOB executable 713 to execute.

LOB executable 713 can first load hooking dynamic library 707 which in turn loads O/S system libraries 742. LOB executable 713 can also optionally load other O/S libraries, such as, O/S libraries 743, which in turn load other O/S libraries, such as, O/S libraries 744.

Dynamic hooking library 707 can be configured to monitor API requests from LOB executable 713. Accordingly, as described, hooking dynamic library 707 can monitor API requests from LOB executable 713 using exported function techniques, function overwriting techniques, method replacement techniques, etc.

During execution, hooking dynamic library 707 can access policy (e.g., from a contained policy file or from a policy database) that is to be enforced against LOB executable 713. Hooking dynamic library 707 can prevent data exchanges with LOB executable 713 when the data exchanges do not comply with the accessed policy. In some embodiments, hooking dynamic library 707 can notify user 752 how to comply with an accessed policy, such as, for example, by authenticating, using encryption, checking GPS coordinates of device 751 against a specified geographic area, or checking time data against a specified time window. When indicated by the accessed policy, hooking dynamic library 707 can also disable LOB executable 713.

Figure 8:
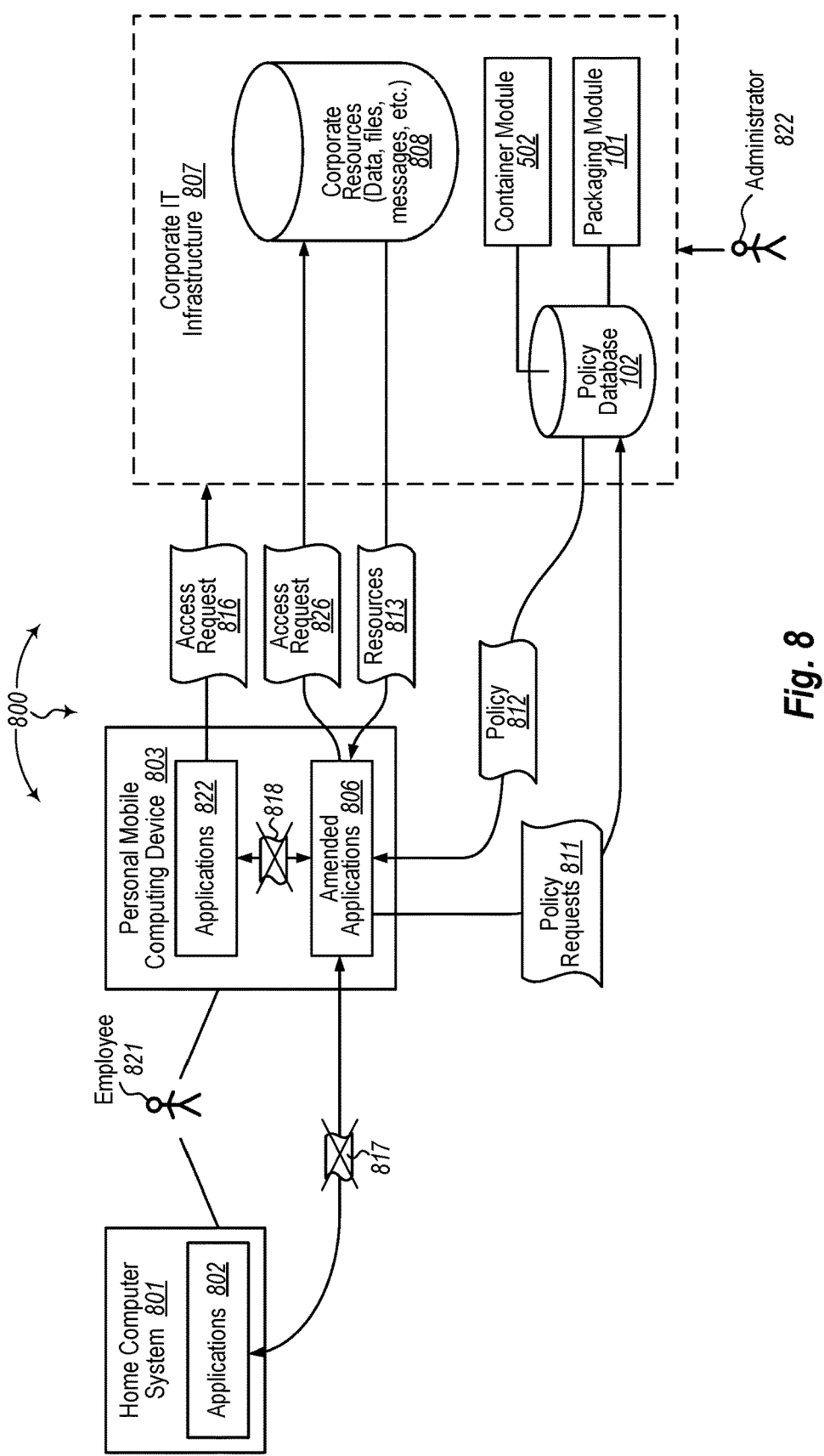
FIG. 8 illustrates a computer architecture with applications operating in a non-cooperative environment.

An amended application (e.g., amended application 722 or 712A) and corresponding policy can be configured within a non-cooperative environment to control what data is exchanged with the amended application. Turning to FIG. 8, FIG. 8 illustrates computer architecture 800 with applications operating in a non-cooperative environment.

As depicted, computer architecture 800 includes home computer system 801, personal mobile computing device 803 (e.g., a mobile phone or tablet), and corporate IT infrastructure 807. Each of home computer system 801, personal mobile computing device 803, and corporate IT infrastructure 807 can be connected to one another over (or be part of) a network, such as, for example, a Local Area Network ("LAN"), a Wide Area Network ("WAN"), and even the Internet. Accordingly, home computer system 801, personal mobile computing device 803, and corporate IT infrastructure 807 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, corporate IT infrastructure 807 includes policy database 102, packaging module 101 and corporate resources 808. Administrator 822 can administer the components and data of corporate IT infrastructure 807 on behalf of a corporate entity. As such, administrator 822 can utilize packaging module 101 to create amended applications, such as, for example, amended applications 806. Administrator 822 can also update policies associated with amended applications in policy database 102.

Employee 821 can be an employee of the corporate entity. Employee 821 can use different computer systems at different times. For example, employee 821 can use applications 802 of home computer system 801 when at home. Employee 821 can carry personal mobile computing device 803 with them and use personal mobile computing device 803 in various different locations. Although employee 821 has primary control of (and may even own) personal mobile computing device 803, it may be of benefit to the corporate entity to permit employee 821 to access parts of corporate resources 808 through personal mobile computing device 803. It may also be of benefit to employee 821 to access parts of corporate resources through personal mobile computing device 803. However, the corporate entity may also have a desire to prevent (intentional or accidently) dissemination of the corporate resources from personal mobile computing device 803 to other computer systems. Thus, employee 821 may agree to permit the installation of amended applications on personal mobile computing device 803.

For example, administrator 822 can install amended applications 806 on personal mobile computing device 803. During execution of an amended application 806, the amended application 806 can contact policy database 102 to understand what management operations to take, such as, for example, disabling a target application, requiring authorization for employee 821, encrypting files, etc., for a corresponding target application. For example, an amended application 806 can send policy request 811 to policy database 102. Policy database 102 can return policy 812 to the amended application 806. Policy 812 indicates what management operations the amended application 806 is to take for a corresponding target application.

The amended application 806 can match policy elements of policy 812 to a set of APIs that are to be intercepted (e.g., APIs related to cut and paste operations). During execution of the corresponding target application, the amended application 806 intercepts API requests from the corresponding target application to APIs in the set of APIs. As employee 821 interacts with the corresponding target application, the amended application 806 can modify the behavior of the corresponding target application based on policy 812. In the case of cut and paste, the amended application 806 may deny an API request of the corresponding target application. In other cases, the amended application 806 may require one or more of: the contents of a file to be encrypted, authorization of the corresponding target application, personal mobile computing device 803 being within a specified geographic area, or the current time at personal mobile computing device 803 to be within a specified time window, before employee 821 can proceed.

Corporate IT infrastructure 807 can be configured to block access requests from non-managed applications. For example, corporate IT infrastructure 807 can block access request 816 from an application 802. On the other hand, corporate IT infrastructure 807 can be configured to permit access requests from managed applications that comply with corresponding policy. For example, corporate IT infrastructure 807 can permit access request 826 from an amended application 806 (e.g., an email program). Corporate IT infrastructure 807 can return resources 813 (e.g., corporate email messages) back to the amended application 806.

A returned policy can prevent amended applications and corresponding target applications from exchanging data with other applications. For example, policy 812 can define that amended applications 806 are prevented from exchanging data with other applications. Crossed out data elements 817 and 818 represent that amended applications 806 and their corresponding target applications are prevented from exchanging data with applications 802 and applications 822.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for grouping a plurality of applications together in a container, the computer-implemented method comprising:

determining that each amended application included in a plurality of amended applications are permitted to exchange data with one another, each amended application having a specified corresponding target application, each amended application associated with at least one policy defining requirements on exchanging data with the specified corresponding target application, the determination based on the associated at least one policy for each amended application, relative to one another, enforcing similar requirements on exchanged data; and based at least on the determination that each amended application in the plurality of amended applications are permitted to exchange data with one another, grouping the specified corresponding target applications together in a container.

2. The computer-implemented method of claim 1, wherein grouping the corresponding target applications together in a container comprises, for each amended application in the plurality of amended applications, updating the associated at least one policy to provide the specified corresponding target application with increased privileges to exchange data with the other specified corresponding embedded target applications.

3. The computer-implemented method of claim 1, further comprising isolating the container from at least one other application by restricting the at least one other application from exchanging data with any of the specified corresponding target applications.

4. The computer-implemented method of claim 3, further comprising subsequent to isolating the container:
during execution of the corresponding plurality of target applications:
detecting that an accessed policy for a particular amended application, from among the plurality of applications, has changed; and
based on the policy change, prohibiting the specified corresponding target application of the particular amended application from exchanging data with other of the plurality of specified corresponding target applications.

5. The computer-implemented method of claim 1, wherein determining that each amended application included in a plurality of amended applications are permitted to exchange data with one another comprises comparing a policy for one amended application to a policy for another amended application.

6. The computer-implemented method of claim 1, wherein determining that each amended application included in a plurality of amended applications are permitted to exchange data with one another comprises determining that policies for the plurality of amended applications enforce compatible requirements on exchanged data.

7. The computer-implemented method of claim 1, wherein determining that each amended application included in a plurality of amended applications are permitted to exchange data with one another comprises determining that the plurality of amended applications are executing on a computing device that is within a specified geographic area.

8. The computer-implemented method of claim 1, wherein determining that each amended application included in a plurality of amended applications are permitted to exchange data with one another comprises:
checking time data; and
determining that the time data indicates a time within a specified time window.

9. The computer-implemented method of claim 1, wherein grouping the specified corresponding target applications together in a container comprises providing the plurality of specified corresponding target applications with access to a named clipboard.

10. A system, the system comprising:
one or more processors;
system memory coupled to the one or more processors, the system memory storing instructions; and
the one or more processors executing the instructions to group a plurality of amended applications together in a container, including the following:
determine which amended applications of the plurality of amended applications are permitted to exchange data with one another, each amended application having a specified corresponding target application, each amended application associated with at least one policy defining requirements on exchanging data with the specified corresponding target application, the determination based on the associated at least one policy for each amended application, relative to one another, enforcing similar requirements on exchanged data; and
based at least on the determination of which of the amended applications of the plurality of amended applications are permitted to exchange data with one another, group the specified corresponding target applications together in a container.

11. The system of claim 10, wherein the one or more processors executing the instructions to group the corresponding target applications together in a container comprises the one or more processors executing the instructions to, for each amended application in the plurality of amended applications, update the associated at least one policy to provide the specified corresponding target application with increased privileges to exchange data with the other specified corresponding embedded target applications.

12. The system of claim 10, further comprising the one or more processors executing the instructions to isolate the container from at least one other application by restricting the at least one other application from exchanging data with any of the specified corresponding target applications.

13. The system of claim 10, further comprising, subsequent to isolating the container, the one or more processors executing the instructions to:
detect that an accessed policy for a particular amended application, from among the plurality of applications, has changed; and
based on the policy change, prohibit the specified corresponding target application of the particular amended application from exchanging data with other of the plurality of specified corresponding target applications.

14. The system of claim 10, wherein the one or more processors executing the instructions to determine which amended applications of the plurality of amended applications are permitted to exchange data with one another comprises the one or more processors executing the instructions to determine that policies for the plurality of amended applications enforce compatible requirements on exchanged data.

15. The system of claim 10, wherein the one or more processors executing the instructions to determine which amended applications of the plurality of amended applications are permitted to exchange data with one another comprises the one or more processors executing the instructions to determine that the plurality of amended applications are executing on a computing device that is within a specified geographic area.

16. The system of claim 10, wherein the one or more processors executing the instructions to determine which amended applications of the plurality of amended applications are permitted to exchange data with one another comprises the one or more processors executing the instructions to determine that individual policies for each amended application included the plurality of amended applications enforce the use of one or more of: encryption on exchanged data or user authentication.

* * * * *